(12) United States Patent
Krochak

(10) Patent No.: US 6,752,535 B2
(45) Date of Patent: Jun. 22, 2004

(54) THRUST BEARING

(75) Inventor: Darryl D. Krochak, Edmonton (CA)

(73) Assignee: Precision Innovations Inc., Edmonton (CA)

( * ) Notice: Subject to any disclaimer, the term of this patent is extended or adjusted under 35 U.S.C. 154(b) by 33 days.

(21) Appl. No.: 10/227,307

(22) Filed: Aug. 26, 2002

(65) Prior Publication Data

US 2004/0037484 A1 Feb. 26, 2004

(51) Int. Cl.$^7$ ............................................. F16C 33/46
(52) U.S. Cl. ...................................................... 384/623
(58) Field of Search ............................... 384/609, 613, 384/614, 615, 618, 621, 622, 623

(56) References Cited

U.S. PATENT DOCUMENTS

| | | | | |
|---|---|---|---|---|
| 2,168,342 A | * | 8/1939 | Horrocks | 384/615 |
| 2,505,110 A | * | 4/1950 | Gordon | 384/614 |
| 3,226,170 A | * | 12/1965 | Neese | 384/623 |
| 3,519,317 A | * | 7/1970 | Spence et al. | 384/614 |
| 4,397,507 A | | 8/1983 | Kraus et al. | |
| 4,732,496 A | | 3/1988 | Shail | |
| 4,861,171 A | * | 8/1989 | Adachi | 384/455 |

FOREIGN PATENT DOCUMENTS

| | | |
|---|---|---|
| CA | 925138 | 4/1973 |
| CA | 1014213 | 7/1977 |
| CA | 1038437 | 9/1978 |
| CA | 2292286 | 6/2001 |

* cited by examiner

*Primary Examiner*—Thomas R. Hannon

(57) ABSTRACT

The present invention provides an improved thrust bearing for extreme service applications through the use of a novel bearing cage assembly and improved surface design of the external face of the circular inside sidewall of the bearing cage assembly and race components. The novel bearing cage assembly allows for an increase in the quantity and size of the roller elements contained within the bearing cage, compared to others known in the art, which substantially increases the thrust bearings' load capacity. Moreover, the employment of a smooth curved surface on the external face of the circular inside sidewall of the bearing cage assembly and race components effectively eliminates any sharp edges and corners which could otherwise damage the rotating shaft. Thus, the combination of these two features substantially increases the load capacity, wear and durability of the thrust bearing components.

17 Claims, 8 Drawing Sheets

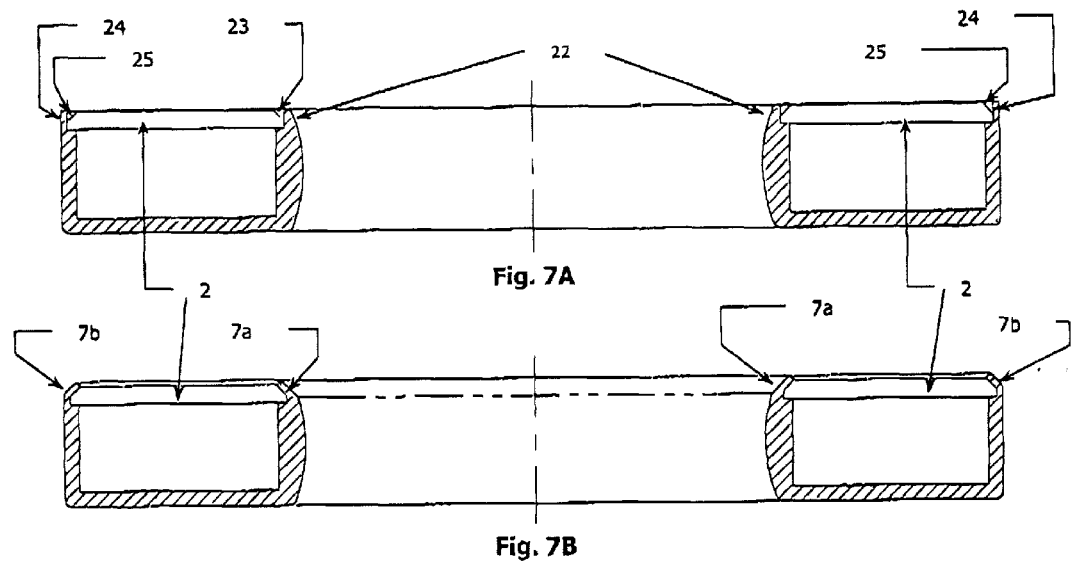
Fig. 7A
Fig. 7B
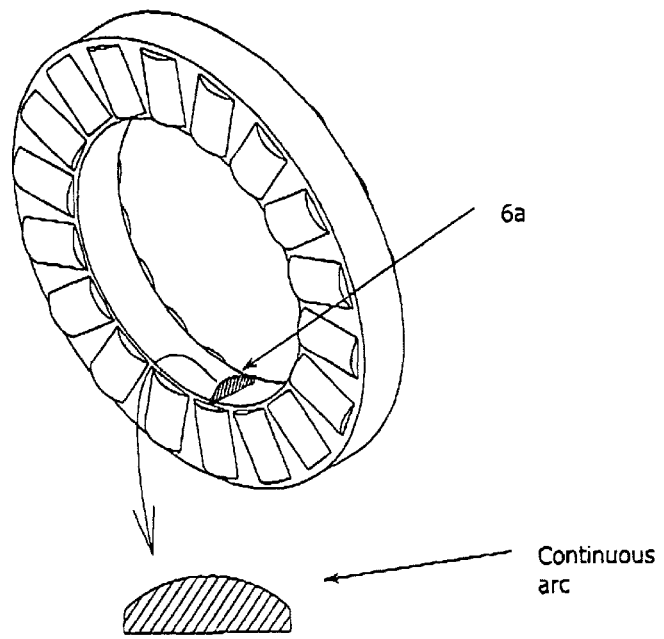
Fig. 8A
Continuous arc the bearing cage and, when the thrust bearing is in use, a rotating shaft through the thrust bearing.
THRUST BEARING

FIELD OF INVENTION

The invention relates to an improved thrust bearing preferably for extreme service applications partly through the use of a novel bearing cage assembly. Moreover, the invention allows for increased durability and useful life of both the thrust bearing and, when the thrust bearing is in use, a rotating shaft through the thrust bearing.

BACKGROUND OF THE INVENTION

Thrust bearings are commonly used In equipment with rotating shafts to absorb axial loads on the shafts and are usually comprised of a bearing cage assembly positioned between a dynamic race and a static race. The races are, for the most part, constructed of hardened steel, and the bearing cage assembly is normally constructed of brass, steel or polymer material.

A bearing cage assembly normally consists of a pair of annular cage portions having opposing upper and lower planar surfaces defining circumferentially spaced slots for receiving roller elements. The dimensions of the roller slots are such that radiused portions of the roller elements extend above the upper and lower planar surfaces which are then guided along a radial path when in contact with the race components.

The potential to obtaining maximum bearing capacity of a thrust bearing lies in the number, length and diameter of the roller elements. Generally, as the internal space in a bearing cage is increased to accommodate an increase in number and/or size of the rolling elements, the bearing's load capacity increases, Therefore, a maximum bearing capacity will be achieved with a bearing cage assembly design that allows for maximum utilization of the internal space which can be occupied by the rolling elements.

There are three equations that may be used to determine the performance of a cylindrical roller thrust bearing. First, the static capacity of a bearing is determined by:

$$C_{oa}=32150 \times ZL_{we}D_{we}$$

Where, $C_{oa}$ is the basic static load rating in pounds force,

Z is the number of rolling elements, $L_{we}$ is the effective roller length in inches, and $D_{we}$ is the effective roller diameter In inches.

Second, the dynamic capacity of a bearing is determined by:

$$C_a=f_{cm}L_{we}^{7/9}Z^{3/4}D_{we}^{29/27}$$

Where, $C_a$ is the basic dynamic load rating in pounds force $f_{cm}$ is a factor influenced by the pitch diameter of the rollers, $L_{we}$ is the effective roller length in inches, Z Is the number of rolling elements, and $D_{we}$ is the effective roller diameter in inches.

Lastly, the basic rating life is determined by:

$$L_{10}=(C_a/P_a)^{10/3} \times 10^6$$

where, $L_{10}$ is life associated with 90% reliability (in total revolutions), $C_a$ is the basic dynamic load rating In pounds force, $P_a$ is the applied load on the bearing in pounds force.

On the basis of the above-noted relationships, it is apparent that by increasing any one or more of the length of the roller elements, the number of the roller elements contained in the bearing cage, and the diameter of the roller elements, the basic static load capacity, the basic dynamic load capacity, and the basic rating life of the bearing substantially increases. For example, increasing the roller length by 10% can result in a 10% increase in static load capacity, an 8% increase in dynamic capacity, and a 37% increase in basic rating life.

Machined bearing cages made from brass or steel require thick cross-sections between the rolling element pockets to keep them sufficiently aligned, Rolling elements are placed in each of the pockets and a ring is secured around the outside diameter to hold the rolling elements in place. Other versions of the two-member steel cages also require thicker side cross-sections to hold the two halves together. This type of design severely limits the size and the quantity of the rolling elements, thus limiting the thrust bearing's capacity.

On the other hand, injection molded cages of polymer material allow extremely thin cross-sections between the rolling element pockets but still require thick peripheral inside and outside sidewalls of the bearing cage frame in order to secure the two halves together. Thick peripheral sidewalls limit the overall size of the rolling elements which can be accommodated by the bearing cage. Thus, similar to the metal bearing cage described above, bearing cages manufactured from polymer material also have limitations on the amount of load capacity that can be achieved as a result of their design, Moreover, the polymer materials easily degrade in high temperature applications and thus, are not the preferred material from which to manufacture bearing cages.

A common drawback associated with the aforementioned machined cages and injection molded cages is that solid dividers are employed to form roller pockets which severely limits the overall size and quantity of the roller elements contained within the bearing cage. In addition, these dividers provide a place for abrasive particles to become lodged and rub on the rolling elements within the bearing cage assembly, thus potentially reducing the life of the bearing. Although the bearings are immersed in lubricant, the latter has a limited ability to remove abrasive grit out from between the roller elements. Eventually, a build-up of abrasive grit occurs and one or more of the roller elements becomes jammed against the cage or is damaged by the grit thereby reducing the life of a thrust bearing.

To facilitate assembly of the bearing cage assembly with the roller elements, the bearing cages are generally formed of a pair of annular members which mate or interlock along an interface normal to the axis of the bearing cage assembly. In most instances, an interlocking engagement is used to secure the two halves of the bearing cage together after the pair of annular members and the roller elements are properly assembled. For example, in Canadian Patent Application No. 2,292,286, one of the cage members is formed with a radially outwardly projecting circumferential lip, while the other cage member is formed with a radially inwardly projecting circumferential lip adapted to interlock with the outwardly projecting lip to prevent axial separation of the cage members while permitting relative rotational movement thereof.

However, a disadvantage to using this type of engagement profile is that optimal thinness of the sidewall cannot be obtained which could otherwise allow for maximized roller fill (roller fill being the volume occupied by the rollers in the bearing cage) and, subsequently, increased bearing load capacity. There is a current need to increase the roller fill of a thrust bearing as well as to increase the service life of such bearing.

Equipment that is subjected to extreme service applications often experience vibrations that can result in contact between the rotating shaft and the bearing race edges. The inside edges of the bearing races are often quite sharp due to the grinding process used to dress the bearing race surfaces. This contact tends to cut sharp grooves into the rotating shaft. The sharp grooves can act as critical notch stress risers and lead to catastrophic failure of the shaft. There is a current need to reduce the risk of such an occurrence.

SUMMARY OF THE INVENTION

According to one aspect of the present invention there is provided a bearing cage assembly component for an axial thrust bearing for a rotating shaft, the component comprising an annular bearing cage frame and a plurality of roller elements, The annular bearing cage frame comprises:

- an inside sidewall and an outside sidewall, the inside sidewall having an exterior surface to be adjacent the rotating shaft, the exterior surface having a smoothly curved axial profile for reducing abrasion on the shaft;
- a base extending between the respective sidewalls and including a plurality of first roller element slots; and
- a top extending between the respective sidewalls and including a plurality of second roller element slots respectively aligned with the first roller element slots thereby providing pairs of aligned roller element slots in the base and top. The plurality of roller elements are respectively spaced from each other around the bearing cage frame at positions between the respective sidewalls. Each of the positions is also between a pair of the aligned roller element slots whereby radiused parts of each of the roller elements protrude through each pair of the aligned roller element slots. Preferably, the smoothly curved axial profile of the exterior surface of said inside sidewall is convex. Further preferably, the smoothly curved axial profile of the exterior surface of the inside sidewall is comprised of a plurality of straight sections joined by smoothly curved sections.

In another aspect, the invention provides a bearing cage assembly component for an axial thrust bearing for a rotating shaft, the component comprising an annular bearing cage frame and a plurality of roller elements, the annular bearing cage frame comprising:

- an inside sidewall and an outside sidewall;
- a base extending between the respective sidewalls and including a plurality of first roller element slots; and
- a top plate extending between the respective sidewalls and including a plurality of second roller element slots respectively aligned with the first roller element slots thereby providing pairs of aligned roller element slots in the base and top plate, the plurality of roller elements being respectively spaced from each other around the bearing cage frame at positions between the respective sidewalls, each of the positions also being between a pair of the aligned roller element slots whereby radiused parts of each of the roller elements protrude through each pair of the aligned roller element slots, and the top plate is secured along an inside perimeter thereof by a crimped top end of the inside sidewall and along an outside perimeter thereof by a crimped top end of the outside sidewall. Preferably, the top plate has a bevelled edge along an upper edge of the inside perimeter such that the crimped top end of the inside sidewall is crimped over the bevelled edge. More preferably, the bevelled edge is at an angle of about 45 degrees to the inside sidewall. The top plate may have a second bevelled edge along an upper edge of the outside perimeter such that the crimped top end of the outside sidewall is crimped over the second bevelled edge. Preferably, the second bevelled edge is at an angle of about 45 degrees to the outside sidewall. The top plate may be supported along a lower edge of the inside perimeter by a ledge around a perimeter of an interior surface of the inside sidewall, and the top plate may also be supported along a lower edge of the outside perimeter by a ledge around a perimeter of an interior surface of the outside sidewall.

In a further aspect, the invention provides a bearing cage assembly component for an axial thrust bearing for a rotating shaft, the component comprising an annular bearing cage frame and a plurality of roller elements, the annular bearing cage frame comprising:

- an inside sidewall and an outside sidewall, the inside sidewall having an exterior surface to be adjacent the rotating shaft, the exterior surface having a smoothly curved axial profile for reducing abrasion on the shaft;
- a base extending between the respective sidewalls and including a plurality of first roller element slots; and
- a top plate extending between the respective sidewalls and Including a plurality of second roller element slots respectively aligned with the first roller element slots thereby providing pairs of aligned roller element slots in the base and top plate, the plurality of roller elements being respectively spaced from each other around the bearing cage frame at positions between the respective sidewalls, each of the positions also being between a pair of the aligned roller element slots whereby radiused parts of each of the roller elements protrude through each pair of the aligned roller element slots; the top plate being secured along an inside perimeter thereof by a crimped top end of the inside sidewall and along an outside perimeter thereof by a crimped top end of the outside sidewall.

The bearing cage assembly forms a strong box-shaped cross-section. Advantageously, one aspect of the design of the bearing cage assembly allows for the utilization of thin sidewalls compared to conventional bearing cages by maximizing the internal space available for containment of the rolling elements. Because more space is available to contain the rolling elements compared to current machined brass or steel versions of a bearing cage, the quantity of the roller elements contained in the bearing cage can be increased. Since a reduction in the thickness of the sidewalls also allows for the length of the roller elements to be increased compared to current polymer versions of the bearing cage, the combination of both these features (i.e. more efficient containment of the roller elements within the internal space of the bearing cage and an increase in the length of the rolling element) ultimately results in a higher capacity thrust bearing. The bearing cage of such configuration also keeps the interior of the bearing cage assembly open, thereby providing better lubrication of the rolling elements because they can be completely surrounded by lubricating grease or oil.

Based on the equations noted above, it was observed that the bearing cage assembly of the present invention was able to increase the dynamic bearing capacity by 44% and the basic rating life by 337% having 13 replacement rollers, each being 15 mm in diameter, 15 mm in length, when compared to a conventional bearing cage assembly having 19 rollers, each being 11 mm In diameter, 11 mm in length. Since the novel design of the bearing cage assembly of the present invention increases the internal space available for containment of the roller elements, an increase in one or more of the number of roller elements, the length of the roller elements and the diameter of the roller elements can be employed. In the foregoing example the number of roller elements actually was decreased, but the increases in roller length and diameter resulted in an overall substantial increase in the load capacity and life of the thrust bearing.

Another aspect of the invention is the utilization of a smoothly curved axial profile on the external surface of the inside circular sidewall of one or more, and optimally all of the components of the thrust bearing (i.e. the dynamic and static bearing races and the bearing cage assembly) which minimizes surface area contact with the rotating shaft and eliminates any sharp edges or corners which could otherwise damage the rotating shaft. One problem solved by the present invention occurs at or near the place of contact between the bearing cage assembly (and race components) and the rotating shaft. More specifically, the locations of contact between the thrust bearing components and the rotating shaft are where the external surfaces of the inside circular sidewalls of the thrust bearing components meet the external surface of the outside circular sidewall of the rotating shaft. When vibrations of the thrust bearing begin to occur under extreme service applications, the presence of any sharp corners or edges on the external surfaces of the circular inside sidewalls of the bearing components have the potential to cut sharp grooves in the rotating shaft. Accordingly, the novel design of the smoothly curved axial profiles of the external surfaces of the circular inside sidewalls of the respective thrust bearing components effectively leads to longer durability and useful life of the shaft. It should be noted that the formation of the smoothly curved axial profile is not limited to a continuous curve, but can be a series of flat surfaces, e.g. a combination of a small flat surface(s), adequately tapered on each side with curves joining them.

Accordingly, it is an object of the invention to provide an improved thrust bearing cage which eliminates the use of dividers between the roller elements and minimizes the thickness of the bearing cage sidewalls thereby maximizing roller element fill and bearing load capacity.

It is a further object of the invention to provide a smooth curved surface on the external face of the circular inside sidewall of the bearing cage and race components to reduce surface area contact with the rotating shaft and prevent damage to the shaft due to the elimination of any sharp edges or corners.

BRIEF DESCRIPTION OF THE DRAWINGS

These and other advantages and features of the Invention will become more apparent from the following description in which reference is made to the appended drawings, wherein:

FIGS. 7A and 7B are axial cross-sectional views of a bearing cage assembly according to the present invention, illustrating pre-crimped and preferred post-crimped edges of the inside and outside sidewalls where such meet the bearing cage plate (or top plate); and FIGS. 8A and 8B are perspective views of preferred embodiments of the bearing cage assembly according to the present Invention in which there is shown on the exterior surface of the inside sidewall, respectively, a smooth continuous convex curve and a smooth curve comprised of straight and tapered surfaces joined by smooth curved sections.

Figure 1:
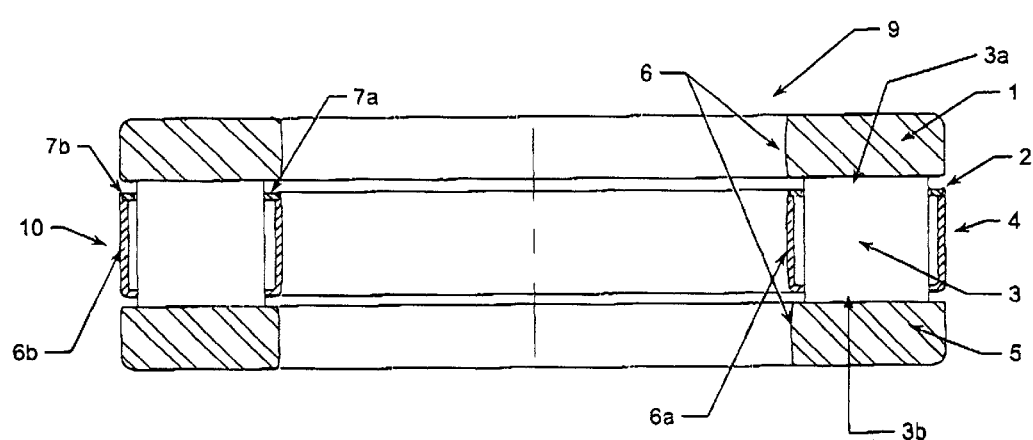
FIG. 1 is an axial cross-sectional view along a diameter of a preferred embodiment of the thrust bearing according to the present invention.

Although one or more embodiments of the invention are explained in detail herein, it is to be understood that the invention is not limited in its application to the details of the construction and the arrangement of the components set forth in the following description or illustrated in the drawings. The invention is capable of other embodiments and of being practiced or being carried out in various ways. Also, it is to be understood that the phraseology and terminology used herein is for the purpose of the description and should not be regarded as limiting.

DETAILED DESCRIPTION OF THE INVENTION

The present invention will now be described with reference to the above drawings.

Figure 2:
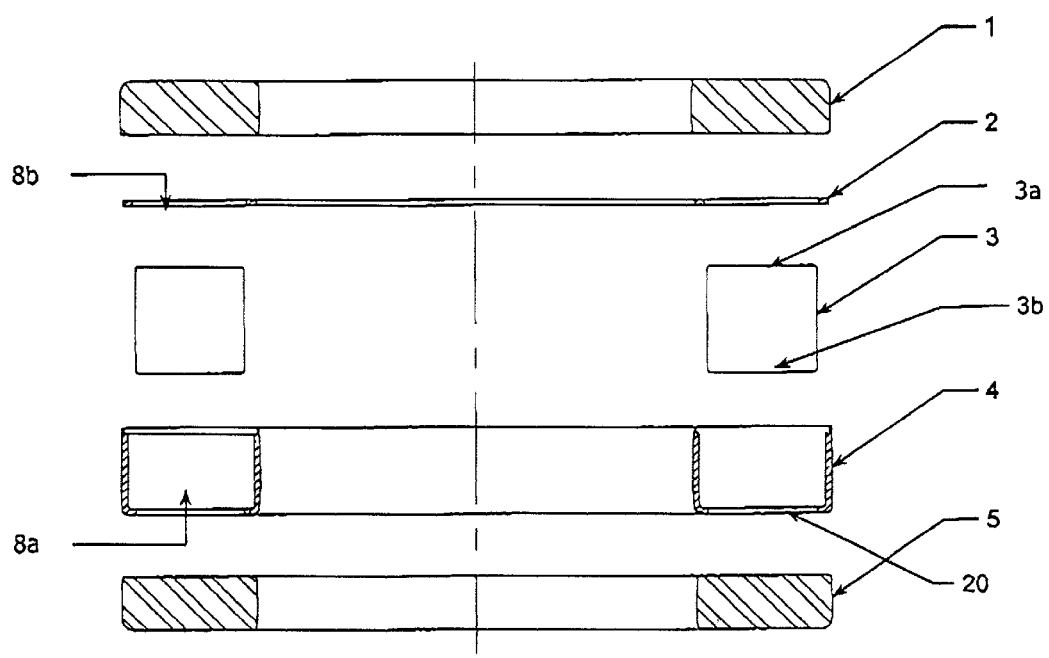
FIG. 2 is an axially exploded view of the thrust bearing of FIG. 1.

FIGS. 1 and 2 provide cross-sectional views of a preferred embodiment of the thrust bearing 9 in an assembled form, and according to its separate components, respectfully. The thrust bearing 9 comprises a dynamic bearing race 1, a static bearing race 5, and a bearing cage assembly 10 positioned between the dynamic bearing race 1 and static bearing race 5. The bearing cage assembly 10 in turn comprises three parts. The first part is an annular bearing cage frame 4 having circular inside and outside sidewalls (6a and 6b respectively), wherein each of the sidewalls preferably has a crimped edge 7a (of the Inside sidewall) and 7b (of the outside sidewall) formed around the periphery of the rim to secure the second part, i.e. bearing cage plate (or "top plate") 2. The first part further includes a base 20 extending between the circular Inside and outside sidewalls 6a, 6b having formed therein a plurality of equally spaced roller element (alignment) slots 8a positioned along a radial circumference to accommodate a lower radiused portion 3b of a roller element 3. A plurality of the roller element 3 is the third part of the annular bearing cage.

The bearing cage plate 2 has a planar surface with a plurality of equally spaced roller element slots 8b (FIG. 3) to accommodate a radiused portion 3a of a roller element 3, each one of the roller element slots 8b of the bearing cage plate 2 being paired with a corresponding roller element slot 8a of the base 20 of the annular bearing cage frame 4.

In assembled form, a plurality of roller elements 3 are in the bearing cage frame 4 and are properly aligned and held in place by axial pairs of the roller element slots 8a, 8b formed in the base 20 and bearing cage plate 2 respectively of the bearing cage frame 4. The bearing cage plate 2 is positioned over the roller elements 3 allowing a radiused portion 3a thereof to protrude through the planar surfaces. The crimped edges 7a, 7b of the bearing cage frame 4 allows the bearing cage plate 2 to be secured on top of the bearing cage frame 4 while maintaining alignment of paired roller element slots 8a, 8b between the base 20 of the bearing cage 4 and the bearing cage plate 2. Thus, the crimped edge 7a, 7b formed around the peripheral rim of the inside and outside sidewalls of the bearing cage frame 4 effectively secures the bearing cage plate 2, and prevents rotation of the bearing cage plate 2 relative to the bearing cage frame 4. The protruding radiused portions 3a, 3b of the roller elements 3 are in use guided or aligned along their radial paths by the roller element slots 8b, 8a.

The dynamic bearing race 1, the bearing cage assembly 10, and the static bearing race 5 when assembled, are axially aligned in their appropriate positions.

It should be noted that while the preferred embodiment of the present invention is described using preferred cylindrical rollers for the roller elements 3, it will be readily apparent to those skilled in the art that needle rollers, ball bearings or other type of roller elements can also be used without deviating from the spirit of this Invention. Selection of a given type and size of roller element will require the roller element slots 8a, 8b to be formed in shape and size in order to accommodate protruding radiused portions of the selected roller elements while sustaining the guiding or aligning function of said slots 8a, 8b.

Figures 4A, 4B:
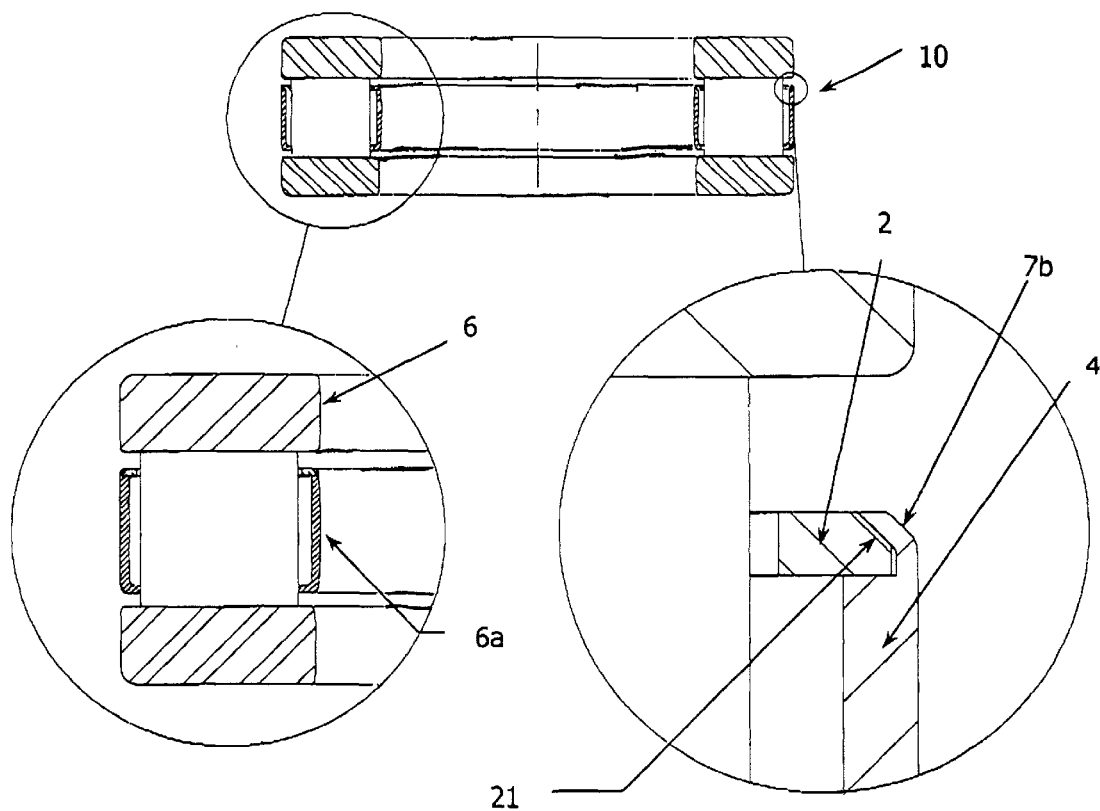
FIGS. 4A and 4B provide enlarged cross-sectional views of portions of the thrust bearing of FIG. 1.
Figure 5:
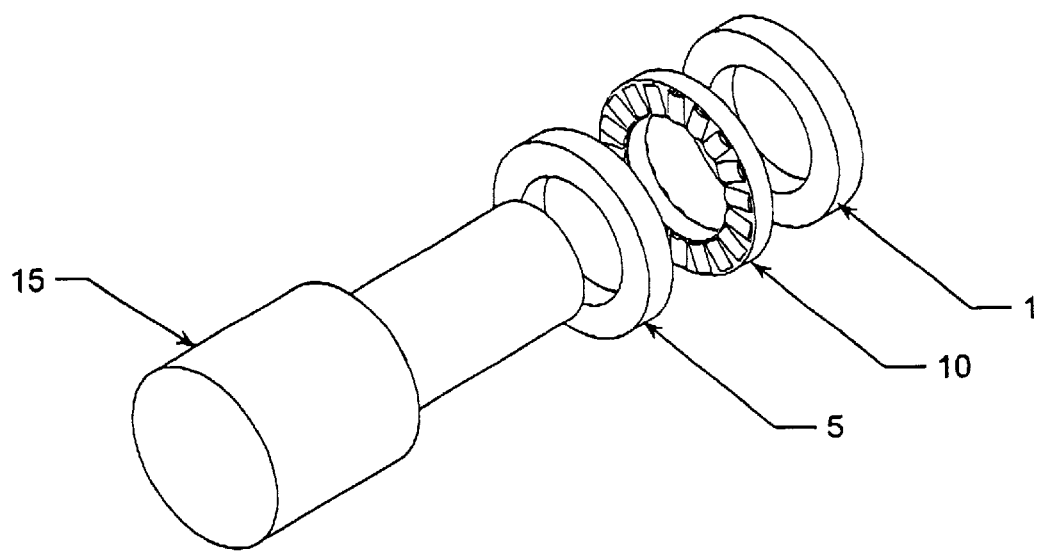
FIG. 5 is a perspective, exploded view of a typical thrust bearing application in accordance with the prior art.
Figure 6A:
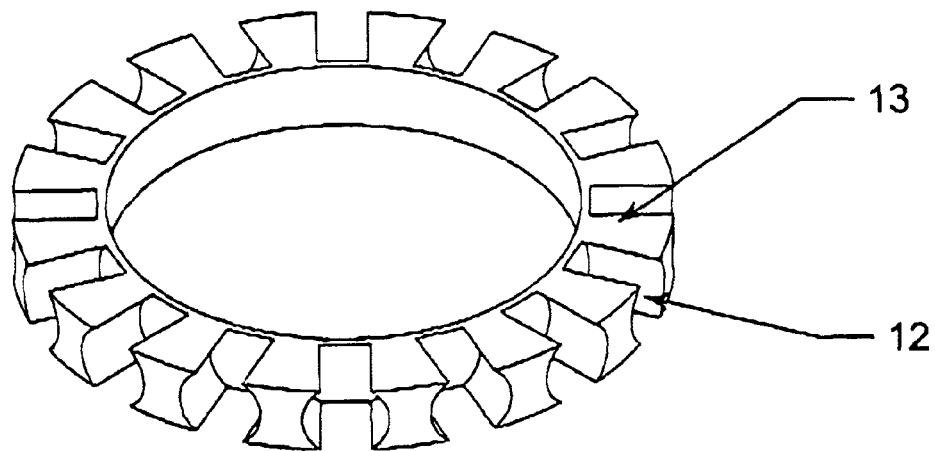
FIGS. 6A and 6B are perspective views of examples of conventional (prior art) bearing cages manufactured from metal and polymer material, respectively.
Figure 6B:
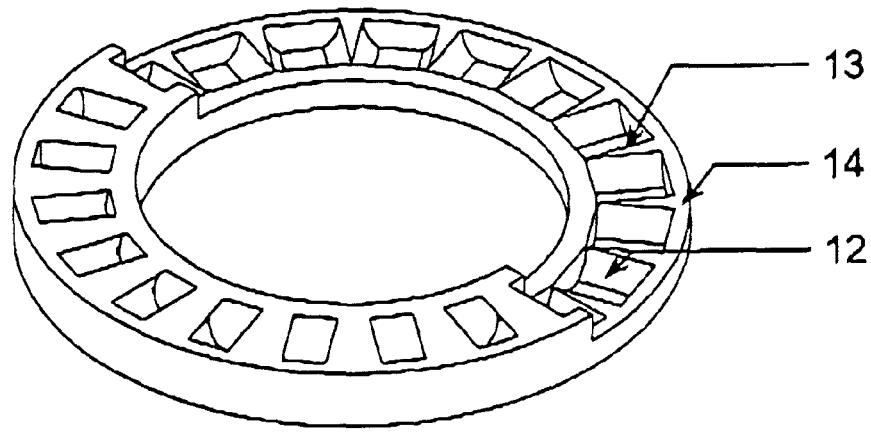

Referring to FIG. 4B, this enlarged cross-sectional view Illustrates a preferred crimped edge 7b of the outer sidewall of the bearing cage frame 4 and a further preferred 45 degree beveled edge 21 formed along the outer peripheral rim of the bearing plate 2. A similar beveled edge is also preferred along the inner peripheral rim of the bearing plate 2. When assembled, the bearing cage assembly 10 effectively forms a strong box-shaped cross-section. The crimped edge 7a on the inside sidewall of the cage frame 4 is bent outwardly at a 45 degree angle, resting against the 45 degree beveled edge formed along the inner peripheral rim (circumference) of the bearing plate 2 and, thus, securing it in position. With reference to FIGS. 7A and 7B, this is achieved in manufacturing the bearing cage frame 4 by pressing a cone-shaped die (represented by arrow "CF") downwardly into the internal space defined by the inside sidewall of the bearing cage frame 4 and deforming the flap 22 until it fits securely against the 45 degree bevel 23 on the bearing plate 2, A corresponding procedure is applied to the outside sidewall of the cage frame 4, using an internal cone-shaped die (not shown), wherein the flap 24 of the bearing cage 4 is deformed inwardly until it fits securely against the 45 degree bevel 25 formed around the outer peripheral rim (circumference) of the bearing plate 2. The top surface of the crimped edges of the bearing cage frame 4 and the top surface of the bearing cage plate 2 preferably are flush with one another, but such is not necessary so long as the radiused portion 3a of the roller elements protrude above such top surface of the crimped edges, Although each beveled edge most preferably is about 45 degrees to the respective inside axial surfaces of the flaps 22, 24, and use of such bevel is much preferred, the bevel is not essential and may generally be selected to be from 0 degrees (i.e. no bevel) to about 55 degrees, more preferably from about 30 to 50 degrees. If there is no bevel to be used, note that the bearing cage sidewalls may be designed with flaps 22, 24 rising above the top surface of the bearing cage plate 2 and the flaps 22, 24 may be crimped 90 degrees e.g., by cutting axial slits at a plurality of locations around each flap 22, 24 and then pressing each flap 22, 24 on top of the adjacent top surface of the bearing cage plate 2.

In the preferred embodiment where such beveled edge is provided on the perimeter inside and outside rims of the bearing cage plate 2, it is noted that the preferred material for the bearing cage frame is selected from deformable material, preferably metal, and of a suitable thickness to allow for crimping of the flaps 22, 24. If the material is too thick and/or too brittle, it will not accommodate the crimping. Preferably, the material for use is thin gage sheet metal having a thickness in the range of about 0.5 mm (0.02 inches) to about 2.0 mm (0.08 inches), most preferably 22 gauge; about 0.7595 mm (0.0299 inches) to 16 gauge about 1.5189 mm (0.0598 inches).

Advantageously, the design of the bearing cage assembly 10 which employs a bearing cage frame 4 having crimped edges 7a, 7b and a bearing cage plate 2 with an optional beveled edge 23, 25 allows thinner sidewalls to be achieved compared to conventional bearing cages. This in turn allows the internal space available for containment of the rolling elements 3 to be maximized. Because the rolling elements 3 can be positioned In closer proximity to one another compared to current machined brass or steel versions of a bearing cage, one or both of the quantity and diameter of roller elements 3 contained in the bearing cage frame 4 may be increased in order to maximize the efficiency of roller fill (i.e. roller fill being the volume occupied by the roller elements within the bearing cage boundaries). Note that increasing roller fill does not necessarily mean an increase in the number of roller elements, but may mean an increase in diameter of the roller elements without adding more roller elements, or possibly even decreasing the number of roller elements so long as there is a net increase in roller fill. A reduction in the thickness of the sidewalls may be expected to allow for the lengths of the roller elements 3 to be increased, e.g. compared to roller elements used in current polymer versions of the bearing cage. Increasing the roller fill within the internal space of the bearing cage frame 4 by one or more of increasing the number of roller elements, the diameter of the roller elements and the lengths of the rolling elements 3, results in a higher load capacity thrust bearing. The bearing cage frame 4 of the present invention also allows for an open interior, thereby allowing for better lubrication of the rolling elements 3 because they are completely surrounded by lubricating grease or oil.

Figure 3:
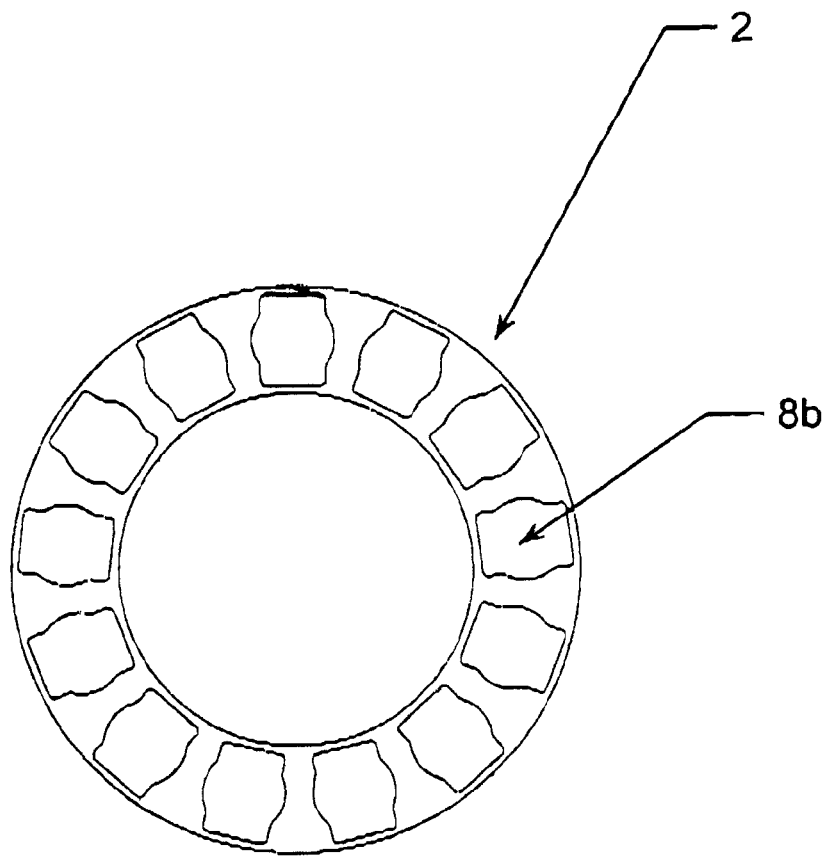
FIG. 3 is a top plan view of one embodiment of the bearing cage assembly of the present invention.

FIG. 3 provides a top plan view of the bearing cage plate 2. The bearing cage plate 2 containing the roller elements slots 8b can be formed by machining, laser cutting, punching, or other suitable mass production methods applied to sheet metal of suitable thickness. Preferably, the type of metal and thickness is similar to the types and thickness discussed above for the bearing cage frame. Similarly, the bearing cage 4 can be formed by machining, punch forming, or other suitable mass production methods applied to such metal.

Figure 8B:
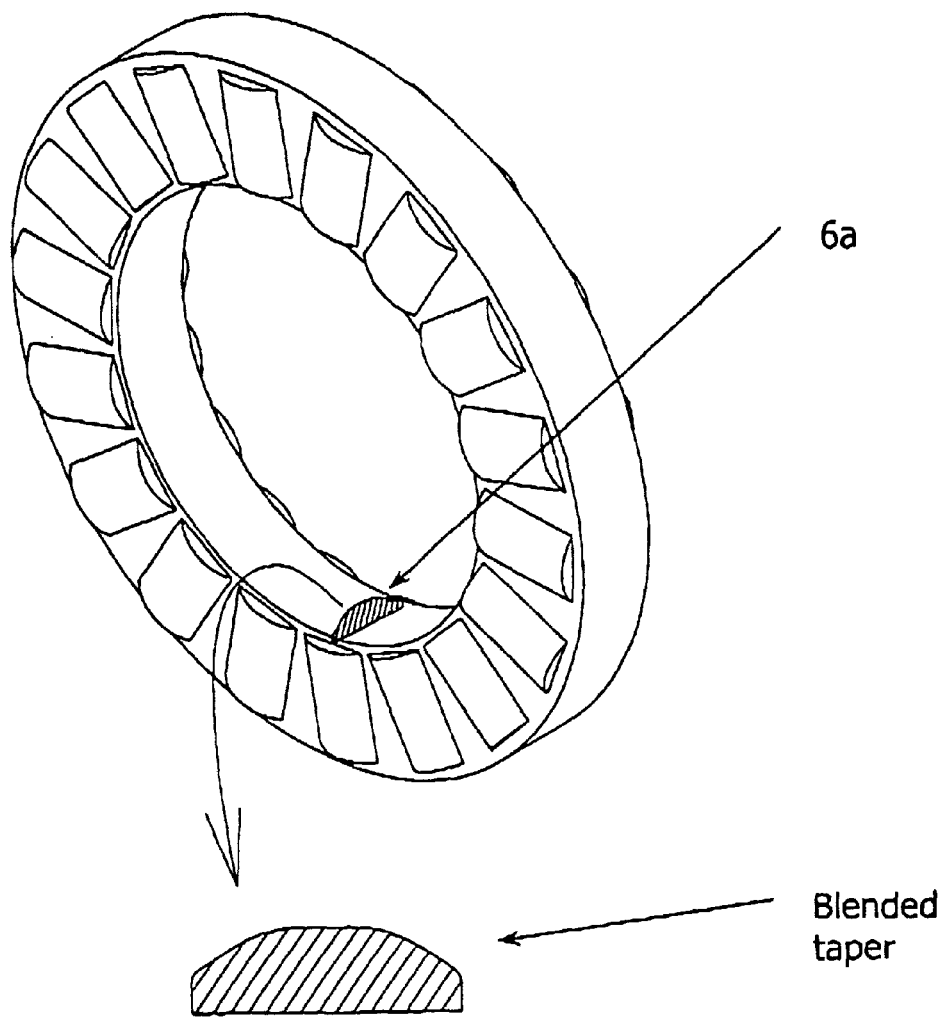

Another aspect of the present invention, shown in FIG. 1, the enlarged cross-sectional view in FIG. 4A and in FIGS. 8A and 88, is the smoothly curved axial profiles 6 on the external surfaces of the inside sidewalls of the dynamic bearing race 1 and static bearing race 5 and the smoothly curved axial profile 6a on the external surface of the inside sidewall of bearing cage assembly 10. (These smoothly curved axial profiles 6, 6a are to be notably distinguished from the curved annular surfaces of these components running adjacently around the circumference of the rotating shaft.) It should be noted that the smoothly curved axial profiles 6, 6a are not limited to a continuous, e.g. concentric, axial curve as shown in FIG. 8A, but may be a combination of small flat surfaces, adequately tapered on each side with curves joining the surfaces as shown in FIG. 8B. An important advantage of the smoothly curved axial profiles 6, 6a is that no sharp corners or edges will come into contact with the rotating shaft 15 which effectively reduces stress and wear on the shaft 15 and increases life and durability of the thrust bearing components. It is noted that while the smoothly curved axial profiles 6, 6a are preferred to be convex, they may be other smoothly curved axial profiles so long as such eliminate sharp corners or edges from contacting the rotating shaft 15. For example, sinusoidal profiles are within the teaching of this invention, although such may in practice be relatively uneconomical to produce.

The smoothly curved axial profile 6a of the external surface of the inside sidewall of the bearing cage frame can be generated by turning the cage frame on a lathe from a solid piece of steel. When boring the inside diameter, a Computer Numeric Control ("CNC") lathe may be programmed to follow the required design profile so to generate the smooth curved surface. Alternatively, the same surface may be obtained by punch forming the cage frame from a flat piece of steel with appropriately shaped forming dies in a manner known to one skilled in the art. A similar method may be employed to make a smoothly curved axial profile on the external surface of the inside sidewall of a dynamic or static bearing race, i.e. on a CNC lathe (before heat treating) or by forging with appropriately shaped dies.

A preferred application of the present invention is on thrust bearings for use in borehole drilling operations, where conditions are especially harsh and challenge the longevity of equipment operating in the borehole.

The following-described test was conducted to evaluate the overall performance of a thrust bearing according to the present invention when subjected to high loads and vibrations, The thrust bearing was installed in a down hole drilling motor subject to harsh drilling conditions. Historically, rotating shaft damage is expected after operation for 60 to 80 hours. The preliminary test run of a first thrust bearing of the present invention lasted 85 hours and close inspection of the rotating shaft indicated no signs of damage. Although a maximum run time has not yet been determined for the thrust bearing of the present invention, the results clearly indicate that the performance of the thrust bearing of the present invention is superior to that of the prior art. To date, runs exceeding 120 hours have seen the bearing and the shaft still in very good condition. The conclusion that can be derived from the results of the test is that the smoothly curved axial profiles employed on the surfaces of the inside circumferences of the bearing cage assembly and the race components substantially reduces rotating shaft wear and damage during operational use. Moreover, the increase in the bearing load capacity due to the increase in the roller fill as a result of the increase in the internal space of the bearing cage assembly extends the useful life and durability of the thrust bearing.

I claim:

1. A bearing cage assembly component for an axial thrust bearing for a rotating shaft, said component comprising an annular bearing cage frame and a plurality of roller elements, said annular bearing cage frame comprising:
   an inside sidewall and an outside sidewall;
   a base extending between the respective sidewalls and including a plurality of first roller element slots; and
   a top plate extending between the respective sidewalls and including a plurality of second roller element slots respectively aligned with the first roller element slots thereby providing pairs of aligned roller element slots in the base and top plate,
   said plurality of roller elements being respectively spaced from each other around the bearing cage frame at positions between the respective sidewalls, each of said positions also being between a pair of said aligned roller element slots whereby radial parts of each of said roller elements protrude through each pair of said aligned roller element slots;
   said top plate being secured along an inside perimeter thereof by a crimped top end of said inside sidewall and along an outside perimeter thereof by a crimped top end of said outside sidewall.

2. The bearing cage assembly component according to claim 1, wherein said top plate has a bevelled edge along an upper edge of said inside perimeter such that said crimped top end of said inside sidewall is crimped over said bevelled edge.

3. The bearing cage assembly component according to claim 2, wherein said bevelled edge is at an angle of about 45° to said inside sidewall.

4. The bearing cage assembly component according to claim 2, wherein said top plate has a second bevelled edge along an upper edge of said outside perimeter such that said crimped top end of said outside sidewall is crimped over said second bevelled edge.

5. The bearing cage assembly component according to claim 4, wherein said second bevelled edge is at an angle of about 45° to said outside sidewall.

6. The bearing cage assembly component according to claim 1, wherein said top plate is supported along a lower edge of said inside perimeter by a ledge around a perimeter of an interior surface of said inside sidewall, and said top plate is also supported along a lower edge of said outside perimeter by a ledge around a perimeter of an interior surface of said outside sidewall.

7. A bearing cage assembly component for an annular thrust bearing for a rotating shaft, said component comprising an annular bearing cage frame and a plurality of roller elements, said annular bearing cage frame comprising:
   an inside sidewall and an outside sidewall, said inside sidewall having an exterior surface to be adjacent the rotating shaft, said exterior surface having a smoothly curved axial profile for reducing abrasion on the shaft;
   a base extending between the respective sidewalls and including a plurality of first roller element slots; and
   a top plate extending between the respective sidewalls and including a plurality of second roller element slots respectively aligned with the first roller element slots thereby providing pairs of aligned roller element slots in the base and top plate,
   said plurality of roller elements being respectively spaced from each other around the bearing cage frame at positions between the respective sidewalls, each of said positions also being between a pair of said aligned roller element slots whereby radial parts of each of said roller elements protrude through each pair of said aligned roller element slots;
   said top plate being secured along an inside perimeter thereof to a crimped top end of said inside sidewall and along an outside perimeter thereof to a crimped top end of said outside sidewall.

8. The bearing cage assembly component according to claim 7, wherein said crimped top end of said inside sidewall forms part of said smoothly curved axial profile of said exterior surface of said inside sidewall.

9. The bearing cage assembly component according to claim 8, wherein said crimped top end of said inside sidewall is crimped over a bevelled edge of said inside perimeter of said top plate.

10. The bearing cage assembly component according to claim 9, wherein said bevelled edge is at an angle of about 45° to said inside sidewall.

11. The bearing cage assembly component according to claim 7, wherein said top plate is supported along a lower edge of said inside perimeter by a ledge around a perimeter of an interior surface of said inside sidewall, and said top plate is also supported along a lower edge of said outside perimeter by a ledge around a perimeter of an interior surface of said outside sidewall.

12. The bearing cage assembly component according to claim 7, wherein said smoothly curved axial profile of said exterior surface of said inside sidewall is convex.

13. The bearing cage assembly component according to claim 7, wherein said smoothly curved axial profile of said exterior surface of said inside sidewall is comprised of a plurality of straight sections joined by smoothly curved sections.

14. The bearing cage assembly component according to claim 7, wherein said bearing cage frame is constructed of metal suitable for withstanding extremely high temperature applications.

15. The bearing cage assembly component according to claim 7, wherein said bearing cage frame is constructed of polymer material suitable for relatively low temperature applications.

16. A thrust bearing for a rotating shaft, said thrust bearing comprising the bearing cage assembly component of claim 7 in combination with a compatible dynamic bearing race and a compatible static bearing race.

17. The thrust bearing according to claim 16, wherein each of said dynamic bearing race and said static bearing race is comprised of an inside sidewall having an exterior surface to be adjacent the rotating shaft, said exterior surface having a smoothly curved axial profile for reducing abrasion on the shaft.

* * * * *